(12) United States Patent
Cai et al.

(10) Patent No.: US 12,124,246 B2
(45) Date of Patent: Oct. 22, 2024

(54) SYSTEMS AND METHODS FOR LASER ABLATION OF A SURFACE

(71) Applicant: THE BOEING COMPANY

(72) Inventors: Fei Cai, Edmonds, WA (US); Paul Z. Thunemann, Seattle, WA (US); James N. Buttrick, Seattle, WA (US); Thomas A. Grandine, Seattle, WA (US); Natalie G. Murray, Seattle, WA (US)

(73) Assignee: The Boeing Company, Chicago, IL (US)

( * ) Notice: Subject to any disclaimer, the term of this patent is extended or adjusted under 35 U.S.C. 154(b) by 189 days.

(21) Appl. No.: 17/651,507

(22) Filed: Feb. 17, 2022

(65) Prior Publication Data
US 2023/0259104 A1 Aug. 17, 2023

(51) Int. Cl.
*G05B 19/418* (2006.01)
*B23K 26/36* (2014.01)
*B23K 101/00* (2006.01)

(52) U.S. Cl.
CPC ........ *G05B 19/41815* (2013.01); *B23K 26/36* (2013.01); *G05B 19/4188* (2013.01); *G05B 19/41885* (2013.01); *B23K 2101/006* (2018.08)

(58) Field of Classification Search
CPC .......... G05B 19/41815; G05B 19/4188; G05B 19/41885; G05B 19/4097; G05B 2219/45082; G05B 2219/45165; B23K 26/36; B23K 2101/006; B23K 26/362
See application file for complete search history.

(56) References Cited

U.S. PATENT DOCUMENTS

| | | | |
|---|---|---|---|
| 5,396,160 A * | 3/1995 | Chen | B25J 9/1664 700/182 |
| 8,417,487 B2 | 4/2013 | Grandine et al. | |
| 2016/0016312 A1* | 1/2016 | Lawrence, III | B25J 9/1671 901/41 |
| 2016/0059493 A1* | 3/2016 | Sparks | B22F 10/25 700/98 |
| 2019/0126328 A1* | 5/2019 | Barclay | B23K 26/362 |
| 2021/0386987 A1* | 12/2021 | Azdoud | A61M 37/0076 |

OTHER PUBLICATIONS

Grandine, " Applications of Contouring", Society for Industrial and Applied Mathematics, SIAM Review vol. 42, No. 2, 2000, pp. 297-316.

* cited by examiner

*Primary Examiner* — Abby Y Lin
*Assistant Examiner* — Dylan M Katz
(74) *Attorney, Agent, or Firm* — Quinn IP Law

(57) ABSTRACT

An apparatus, method and computer-readable storage medium are provided for laser ablation of a structural part. The method includes accessing a digital model of the structural part, and tiling the digital model into tiles that correspond to respective regions of the structural part. The method includes determining discrete tool paths of a machine tool for respective ones of the tiles for laser ablation of the respective regions of the structural part. And the method includes generating instructions for the machine tool to perform the laser ablation of the structural part according to the discrete tool paths.

21 Claims, 10 Drawing Sheets

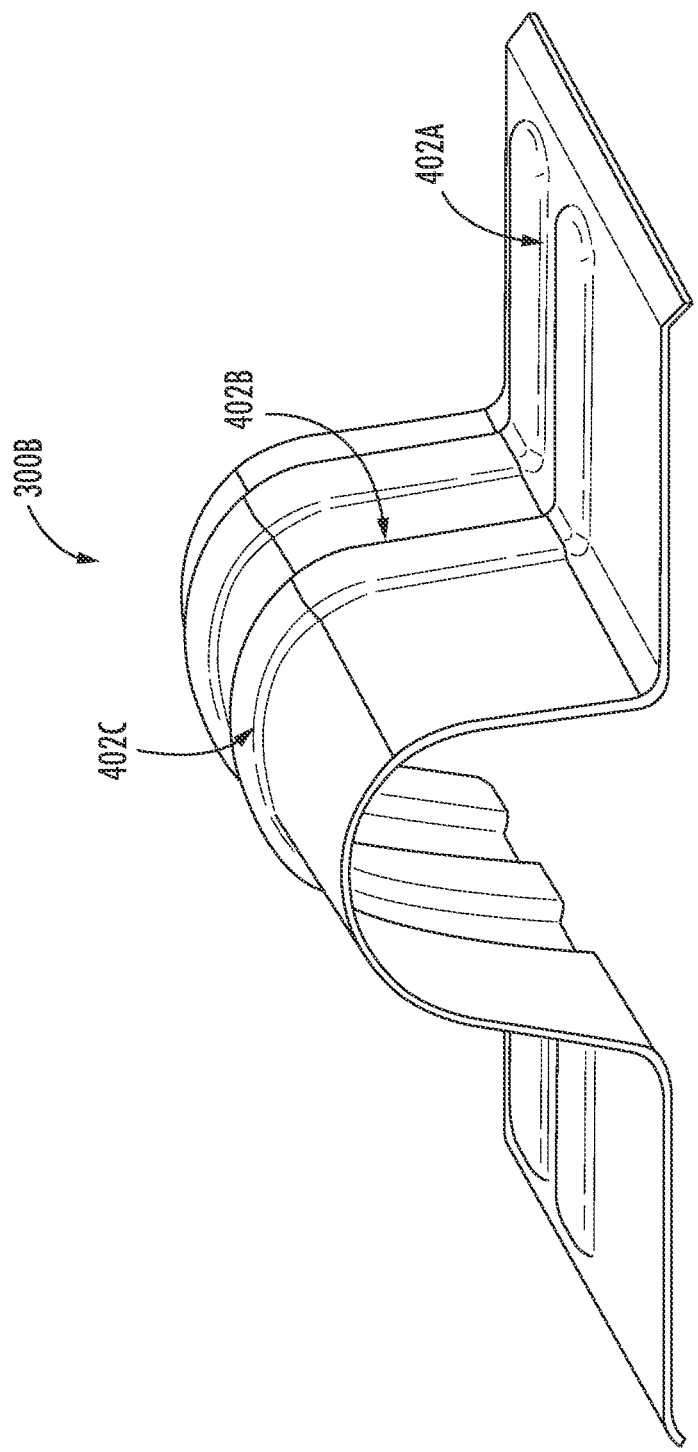

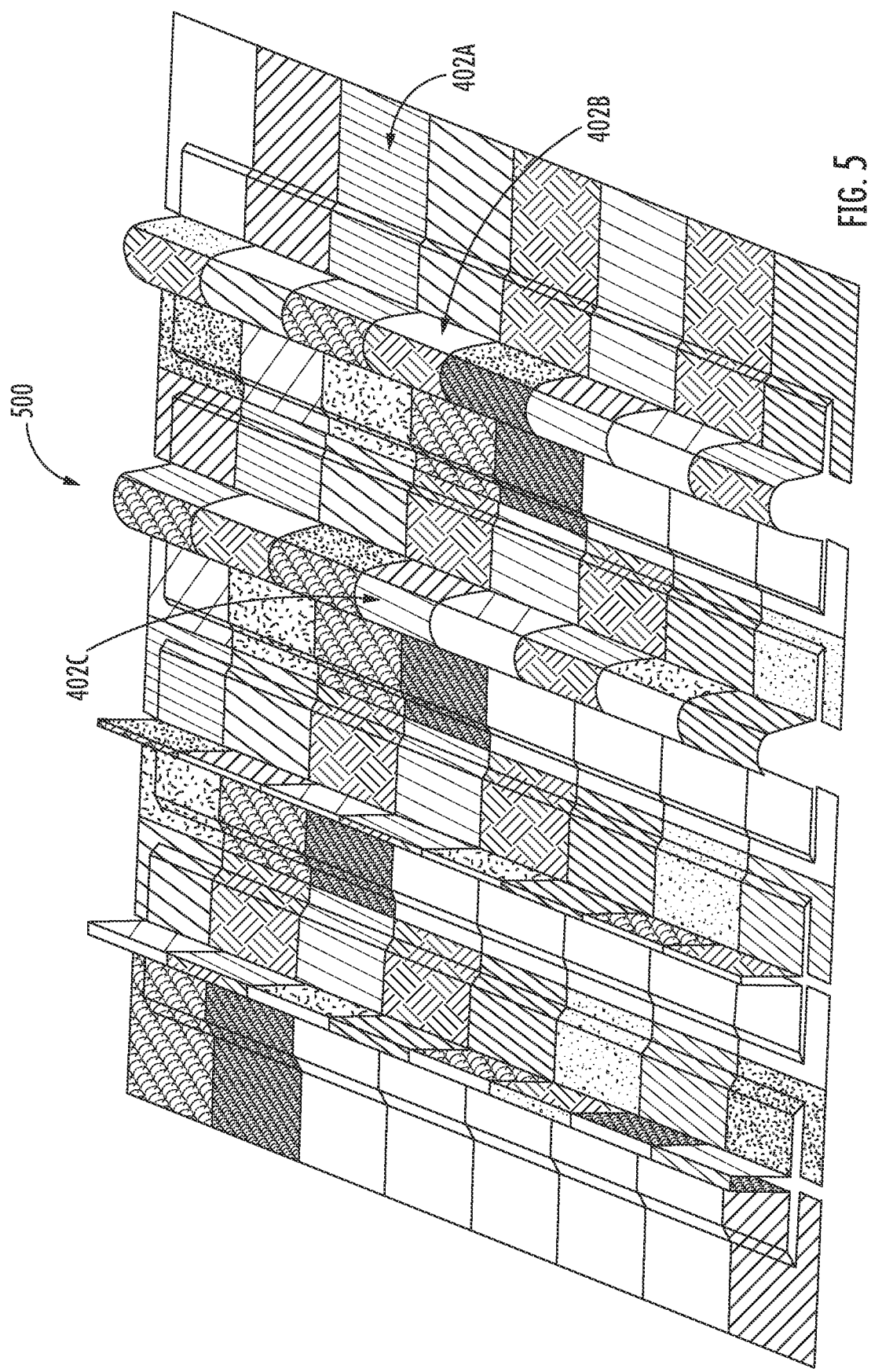

714 — PERFORM A SMOOTHING OF THE SURFACE REPRESENTATION BEFORE THE SURFACE REPRESENTATION IS TILED, AND IN WHICH A CONVOLUTION MATRIX IS APPLIED TO THE SURFACE REPRESENTATION

FIG. 7c

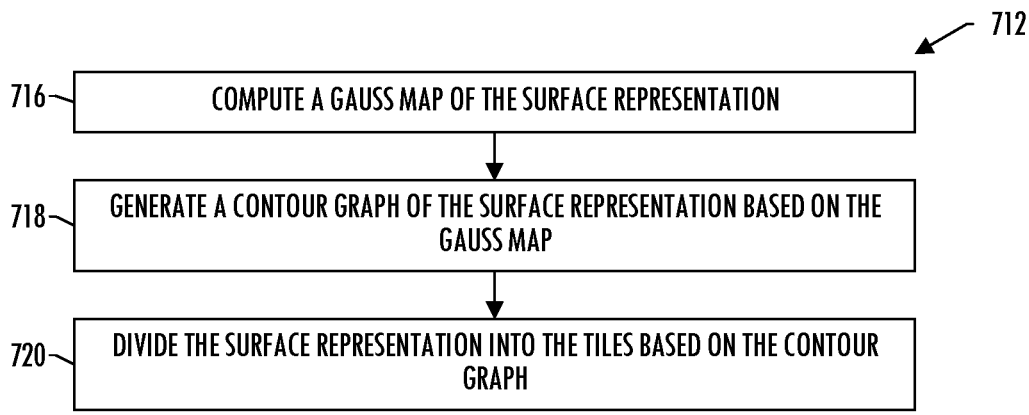

716 — COMPUTE A GAUSS MAP OF THE SURFACE REPRESENTATION

718 — GENERATE A CONTOUR GRAPH OF THE SURFACE REPRESENTATION BASED ON THE GAUSS MAP

720 — DIVIDE THE SURFACE REPRESENTATION INTO THE TILES BASED ON THE CONTOUR GRAPH

FIG. 7d

722 — DETERMINE AN ORIENTATION OF THE LASER AS THE MACHINE TOOL TRAVELS THE DISCRETE TOOL PATHS TO PERFORM THE LASER ABLATION

FIG. 7e

SYSTEMS AND METHODS FOR LASER ABLATION OF A SURFACE

TECHNOLOGICAL FIELD

The present disclosure relates generally to manufacturing and, in particular, to laser ablation of structural parts in preparation for the application of paint thereto.

BACKGROUND

Structural parts, such as for example, aircraft components are painted to protect the components from exposure to various materials that can harm or damage them. For example, aircraft components and other structural parts are painted to protect against various salts, oxidation, spills of jet fuel and other chemicals that can cause structural and surface damage. In order to ensure that the paint more effectively adheres to the surface of the structural part, the part is either sanded or ablated to create small, rough ridges on which the paint can stick. Manually sanding parts by hand is time consuming, labor intensive, and therefore costly.

Current laser ablation techniques are much faster and less labor intensive than manual sanding, of course, but they do not perform very precise ablations of the surface of the structural part, meaning the paint does not effectively adhere to the part as desired. As a result, the user of the laser has to re-position the laser manually and perform multiple ablations to each section of a part to ensure effective adhesion of the paint.

BRIEF SUMMARY

Example implementations of the present disclosure are directed to laser ablation systems and methods for ablating structural part surfaces, such as for example, aircraft component surfaces. The laser ablation techniques increase the paint adhesion properties of the structural parts. The subject matter of the present disclosure is directed to determining an angle, position, and orientation of the laser such that the laser is able to effectively ablate the surface of the structural part or component without having to go over the component multiple times. That is, the orientation and position of the laser is determined such that an average intensity of the laser over each surface of the aircraft component is maximized. Many structural parts do not have flat or smooth surfaces. The parts are rounded, have contours, edges, plateaus, and areas that incline with respect to the remainder of the surfaces of the part. These features can result in the laser having to make several passes over a certain portion of the part to make sure the features are properly ablated and have adequate adhesion characteristics.

In order to find the ideal orientation and position of the laser, a digital model of the structural part is divided into multiple different regions or tiles (e.g., using tiling techniques). Each region of the structural part is then analyzed and an orientation of the laser is determined such that, when the corresponding region on the physical part is ablated by the laser, substantially all of the surfaces of the region of the structural part achieves an adhesion characteristic sufficient to adhere paint.

The present disclosure thus includes, without limitation, the following example implementations.

Some example implementations provide an apparatus for laser ablation of a structural part, the apparatus comprising: a memory configured to store computer-readable program code; and processing circuitry configured to access the memory, and execute the computer-readable program code to cause the apparatus to at least: access a digital model of the structural part; tile the digital model into tiles that correspond to respective regions of the structural part; determine discrete tool paths of a machine tool for respective ones of the tiles for laser ablation of the respective regions of the structural part; and generate instructions for the machine tool to perform the laser ablation of the structural part according to the discrete tool paths.

Some example implementations provide a method of laser ablation of a structural part, the method comprising: accessing a digital model of the structural part; tiling the digital model into tiles that correspond to respective regions of the structural part; determining discrete tool paths of a machine tool for respective ones of the tiles for laser ablation of the respective regions of the structural part; and generating instructions for the machine tool to perform the laser ablation of the structural part according to the discrete tool paths.

Some example implementations provide a computer-readable storage medium for laser ablation of a structural part, the computer-readable storage medium being non-transitory and having computer-readable program code stored therein that, in response to execution by processing circuitry, causes an apparatus to at least: access a digital model of the structural part; tile the digital model into tiles that correspond to respective regions of the structural part; determine discrete tool paths of a machine tool for respective ones of the tiles for laser ablation of the respective regions of the structural part; and generate instructions for the machine tool to perform the laser ablation of the structural part according to the discrete tool paths.

Some example implementations provide a system for laser ablation, the system comprising: a machine tool configured to perform laser ablation of a structural part; and a computer configured to receive instructions, and control the machine tool to perform the laser ablation according to the instructions that include discrete tool paths of the machine tool for laser ablation of respective regions of the structural part, the discrete tool paths having been determined from a tiling of a digital model of the structural part into tiles that correspond to respective ones of the regions.

These and other features, aspects, and advantages of the present disclosure will be apparent from a reading of the following detailed description together with the accompanying FIGURES, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying FIGURES which illustrate, by way of example, the principles of some described example implementations.

BRIEF DESCRIPTION OF THE FIGURES

Figure 1:
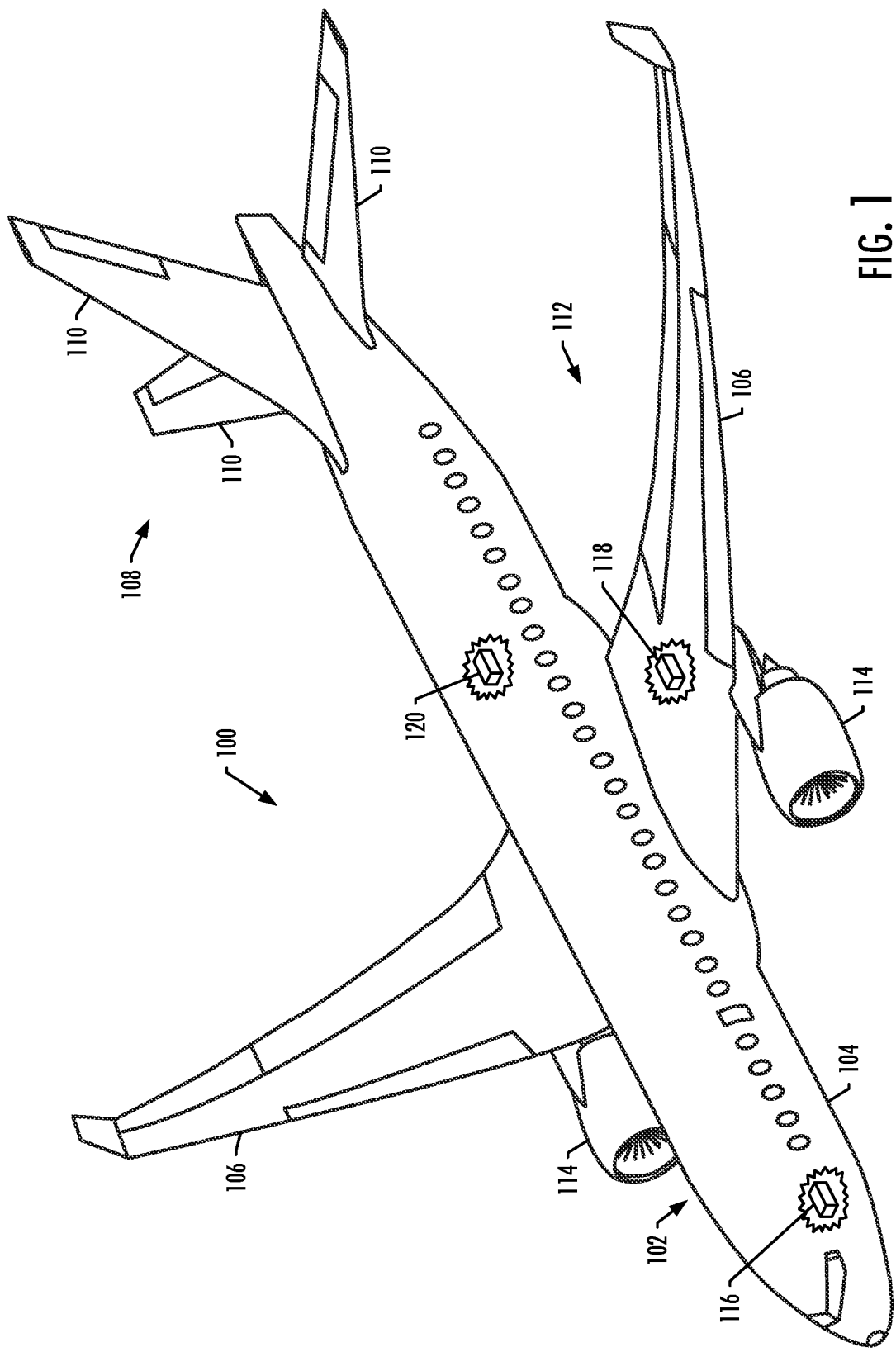
Figure 2:
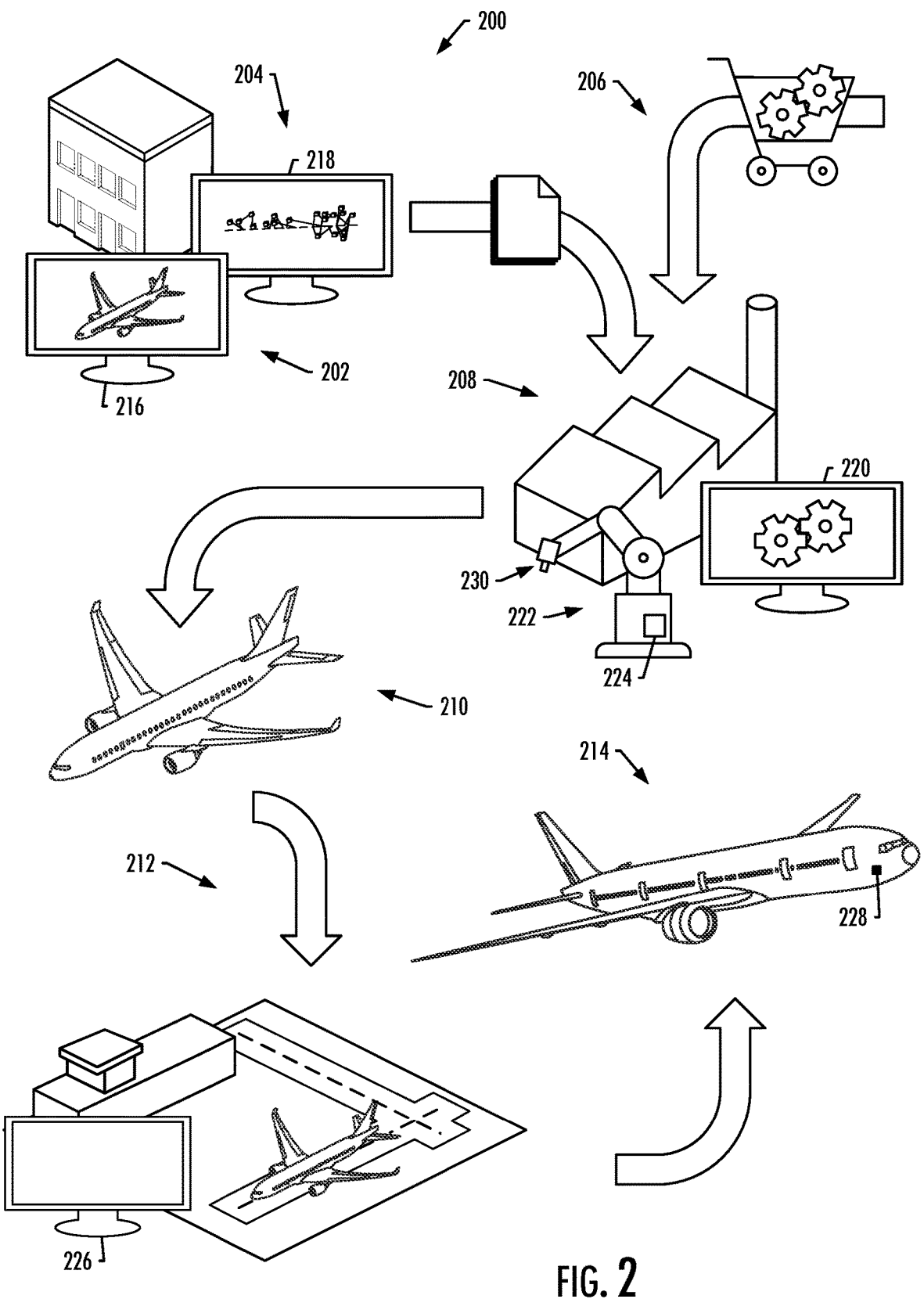
Figures 3A, 3B:
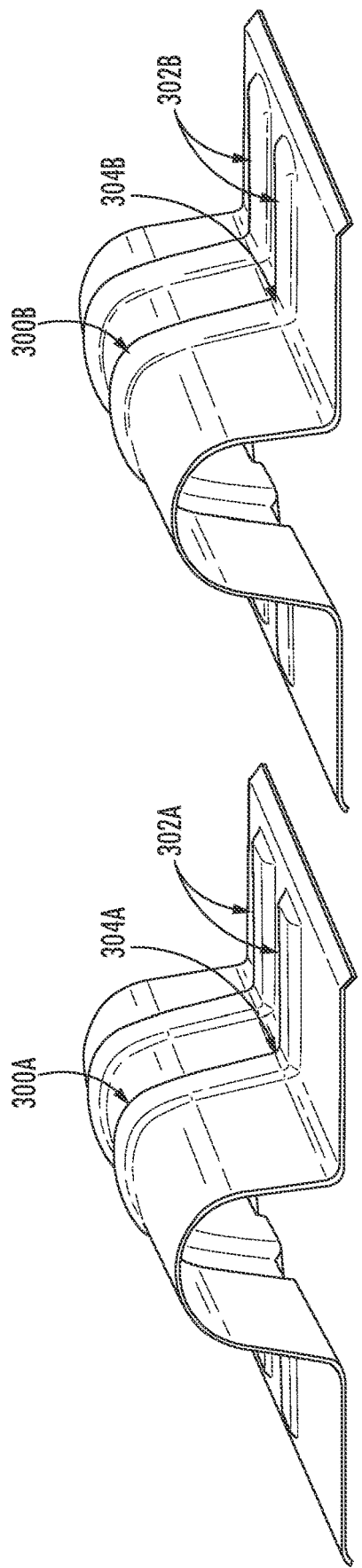
Figure 6:
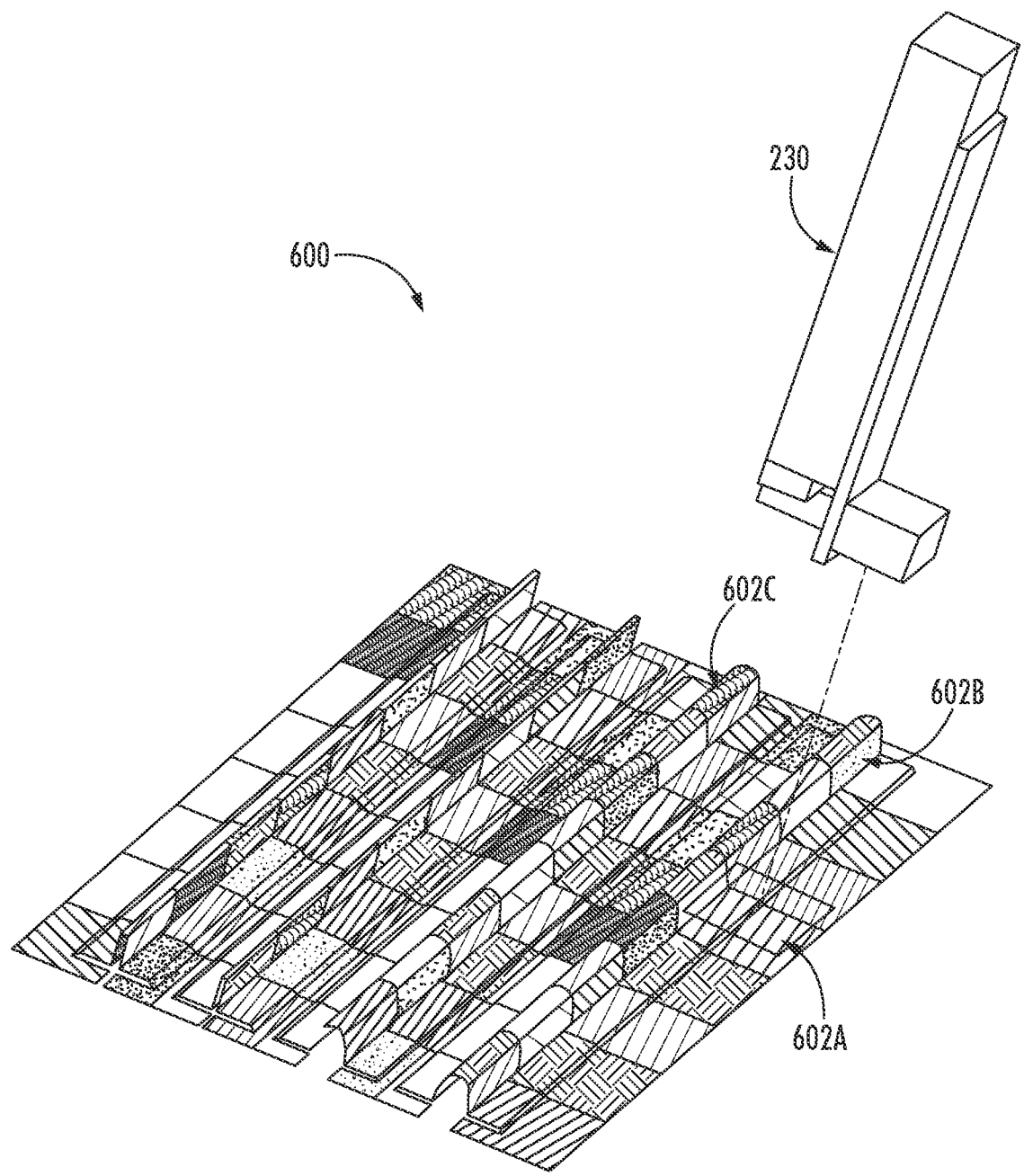
Figure 7A:
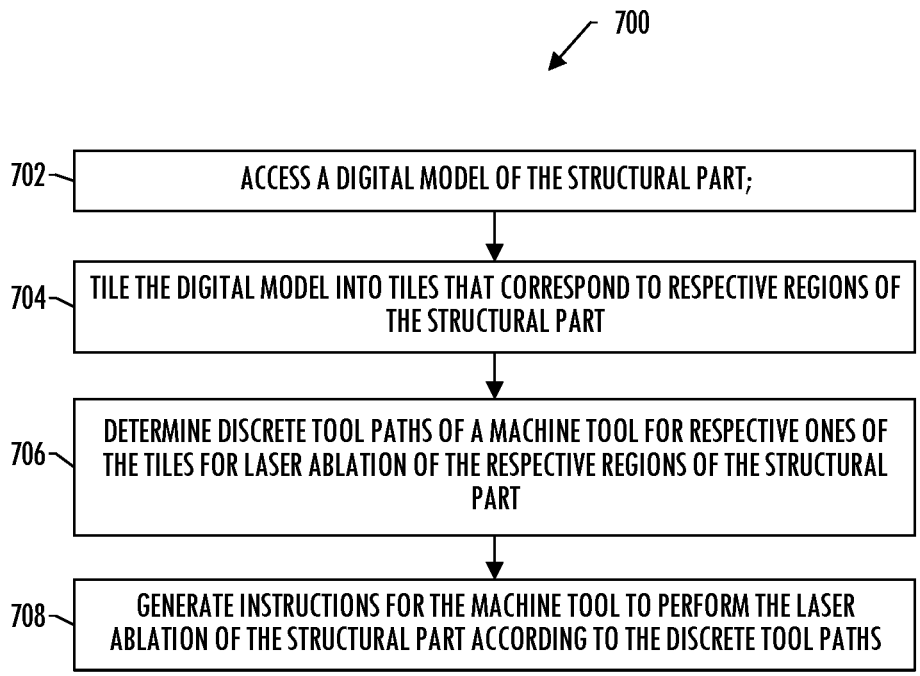
Figure 7B:
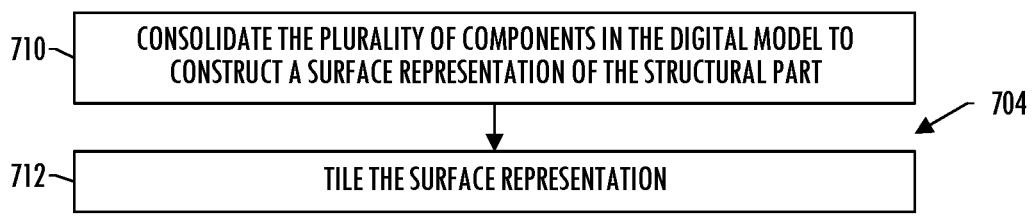
Figure 7F:
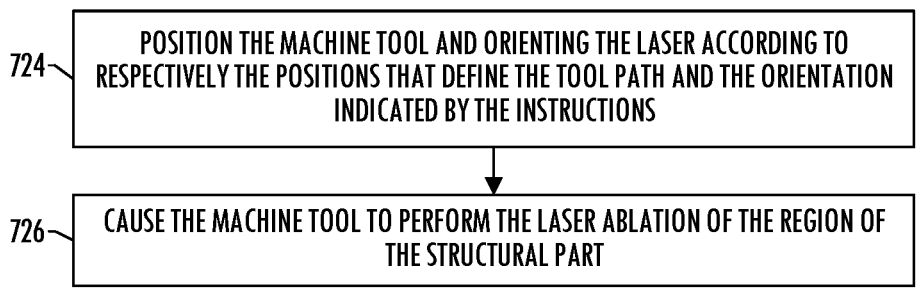
Figure 7G:
Figure 8:
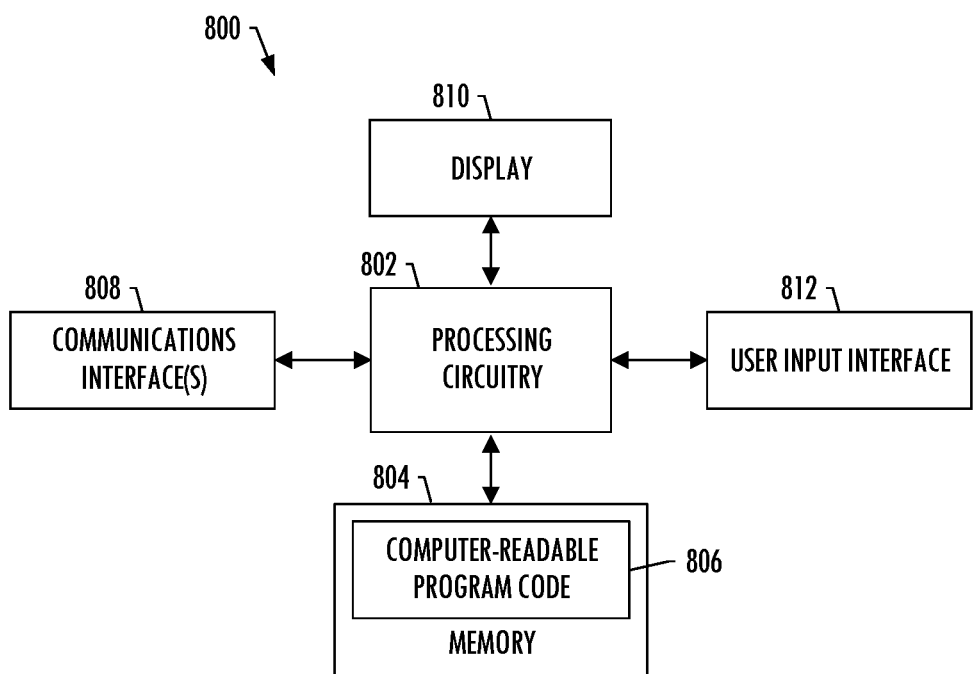

Having thus described example implementations of the disclosure in general terms, reference will now be made to the accompanying FIGURES, which are not necessarily drawn to scale, and wherein:

FIG. 1 illustrates one type of vehicle, namely, an aircraft that may benefit from example implementations of the present disclosure;

FIG. 2 illustrates an aircraft manufacturing and service method, according to some example implementations;

FIGS. 3A and 3B illustrate digital models of the same portion of a structural part, where FIG. 3A is the digital model of the portion of the structural part before any manipulation is performed and FIG. 3B illustrates the digital mode of the portion after a convolution matrix is applied to the model, according to example implementations;

FIG. 4 illustrates the digital model of the portion illustrated in FIGS. 3A and 3B after the convolution matrix is applied and further illustrates tiling of the portion of the structural part, according to example implementations;

FIG. 5 illustrates a digital model of the entire structural part with each portion divided, or tiled, into multiple regions according to example implementations;

FIG. 6 illustrates the physical structural part being ablated with a laser positioned and oriented to maximize an average laser intensity over each surface of the physical structure part for an effective ablation, according to example implementations;

FIGS. 7A, 7B, 7C, 7D, 7E, 7F and 7G are flowcharts illustrating various steps in a method of laser ablation of a structural part, according to example implementations; and FIG. 8 illustrates an apparatus according to some example implementations.

DETAILED DESCRIPTION

Some implementations of the present disclosure will now be described more fully hereinafter with reference to the accompanying FIGURES, in which some, but not all implementations of the disclosure are shown. Indeed, various implementations of the disclosure can be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to vehicular engineering and, in particular, to one or more of the design, construction, operation, maintenance, or use of vehicles. As used herein, a vehicle is a machine designed as an instrument of conveyance by land, water or air. A vehicle designed and configurable to fly may at times be referred to as an aerial vehicle, an aircraft or the like. Other examples of suitable vehicles include any of a number of different types of ground vehicles (e.g., motor vehicles, railed vehicles), watercraft, amphibious vehicles, spacecraft and the like.

A vehicle generally includes a basic structure, and a propulsion system coupled to the basic structure. The basic structure is the main supporting structure of the vehicle to which other components are attached. The basic structure is the load-bearing framework of the vehicle that structurally supports the vehicle in its construction and function. In various contexts, the basic structure may be referred to as a chassis, an airframe or the like.

The propulsion system includes one or more engines or motors configured to power one or more propulsors to generate propulsive forces that cause the vehicle to move. A propulsor is any of a number of different means of converting power into a propulsive force. Examples of suitable propulsors include rotors, propellers, wheels and the like. In some examples, the propulsion system includes a drivetrain configured to deliver power from the engines/motors to the propulsors. The engines/motors and drivetrain may in some contexts be referred to as the powertrain of the vehicle.

FIG. 1 illustrates one type of vehicle, namely, an aircraft 100 that may benefit from example implementations of the present disclosure. As shown, the aircraft includes a basic structure with an airframe 102 including a fuselage 104. The airframe also includes wings 106 that extend from opposing sides of the fuselage, an empennage or tail assembly 108 at a rear end of the fuselage, and the tail assembly includes stabilizers 110. The aircraft also includes a plurality of high-level systems 112 such as a propulsion system. In the particular example shown in FIG. 1, the propulsion system includes two wing-mounted engines 114 configured to power propulsors to generate propulsive forces that cause the aircraft to move. In other implementations, the propulsion system can include other arrangements, for example, engines carried by other portions of the aircraft including the fuselage and/or the tail. As also shown, the high-level systems may also include an electrical system 116, hydraulic system 118 and/or environmental system 120. Any number of other systems may be included.

As explained above, example implementations of the present disclosure relate generally to vehicular engineering and, in particular, to one or more of the design, construction, operation or use of vehicles such as aircraft 100. Thus, referring now to FIG. 2, example implementations may be used in the context of an aircraft manufacturing and service method 200. During pre-production, the example method may include specification and design 202 of the aircraft, manufacturing sequence and processing planning 204 and material procurement 206. During production, component and subassembly manufacturing 208 and system integration 210 of the aircraft takes place. Thereafter, the aircraft may go through certification and delivery 212 in order to be placed in service 214. While in service by an operator, the aircraft may be scheduled for maintenance and service (which can also include modification, reconfiguration, refurbishment or the like).

Each of the processes of the example method 200 can be performed or carried out by a system integrator, third party and/or operator (e.g., customer). For the purposes of this description, a system integrator can include for example any number of aircraft manufacturers and major-system subcontractors; a third party can include for example any number of vendors, subcontractors and suppliers; and an operator can include for example an airline, leasing company, military entity, service organization or the like.

As will also be appreciated, computers are often used throughout the method 200; and in this regard, a "computer" is generally a machine that is programmable or programmed to perform functions or operations. The method as shown makes use of a number of example computers. These computers include computers 216, 218 used for the specification and design 202 of the aircraft, and the manufacturing sequence and processing planning 204. The method can also make use of computers 220 during component and subassembly manufacturing 208, which can also make use of computer numerical control (CNC) machines, machine tools 222 or other robotics that are controlled by computers 224. The machine tools can include one or more lasers 230, such as for example, an ultraviolet (UV) laser, carbon dioxide laser, or a neodymium-doped yttrium aluminum garnet (Nd:YAG) laser. Furthermore, the computers controlling the machine tools can receive instructions for controlling the machine tools. Example instructions for controlling the machine tools according to the present disclosure are described in more detail below.

Even further, computers 226 can be used while the aircraft is in service 214, as well as during maintenance and service; and as suggested in FIG. 1, the aircraft can itself include one or more computers 228 as part of or separate from its electrical system 116.

A number of the computers 216-228 used in the method 200 can be co-located or directly coupled to one another, or in some examples, various ones of the computers can communicate with one another across one or more computer networks. Further, although shown as part of the method, it should be understood that any one or more of the computers can function or operate separate from the method, without regard to any of the other computers. It should also be understood that the method can include one or more additional or alternative computers than those shown in FIG. 2.

Example implementations of the present disclosure can be implemented throughout the aircraft manufacturing and service method 200, but are particularly well suited for implementation during production or during servicing of damage components. In this regard, some example implementations provide methods and systems for performing laser ablation on structural parts, for example, on aircraft structural parts during the production phase of those parts or to replace damaged parts in a servicing and maintenance phase of the structural parts.

As described above, the problem with current laser ablation techniques is that, while they are much faster and less labor intensive than manual sanding, they do not perform very precise ablations of the surface of the structural part, meaning the paint does not effectively adhere to the part as desired. As a result, the user of the laser has to re-position the laser manually and perform multiple ablations to each section of a part to ensure effective adhesion of the paint. Even then, it is difficult to re-position the laser manually to have the right orientation with respect to the surface it is ablating. The technical solution to this problem provided herein is that the orientation of the laser, for each section of the surface being ablated, is determined more precisely with the calculations provided herein. Additionally, the laser can be adjusted automatically based on the calculations to orient the laser to achieve an ideal ablation of the surface.

Example implementations of the present disclosure provide a computer 220 for laser ablation of a structural part. The computer is configured to access a digital model of the structural part. The computer is configured to tile the digital model into tiles that correspond to respective regions of the structural part. The computer is configured to determine discrete tool paths of a machine tool 222 for respective ones of the tiles for laser ablation of the respective regions of the structural part. And the computer is configured to generate instructions for the machine tool to perform the laser ablation of the structural part according to the discrete tool paths.

In some examples, the structural part includes a plurality of components (e.g., corners, ramps, walls, etc.). In some of these examples, the computer 220 is further configured to consolidate the plurality of components in the digital model to construct a surface representation of the structural part, and the computer configured to tile the digital model includes the computer configured to tile the surface representation. In some examples, the plurality of components are consolidated to construct the surface representation in which components of the plurality of components are represented by respective single tensor product splines.

In some examples, the computer 220 is further configured to perform a smoothing of the surface representation before the surface representation is tiled, and in which a convolution matrix is applied to the surface representation. In some examples, the computer configured to tile the surface representation includes the computer configured to compute a Gauss map of the surface representation. The computer is configured to generate a contour graph of the surface representation based on the Gauss map and then divide the surface representation into the tiles based on the contour graph.

In some examples, the machine tool 222 includes a laser 230, and the computer 220 configured to determine the discrete tool paths includes the computer configured to determine an orientation (e.g., expressed using one or more orientation coordinates) of the laser as the machine tool travels the discrete tool paths to perform the laser ablation. In some examples, the discrete tool paths include a tool path of the machine tool for laser ablation of a region of the respective regions of the structural part, and the orientation of the laser is determined to minimize a deviation between a normal of a centroid of the region, and a direction from the region to the laser as the machine tool travels an immediately preceding one of the discrete tool paths. In some examples, the discrete tool paths include a tool path of the machine tool for laser ablation of a region of the respective regions of the structural part, and the instructions indicate positions of the machine tool that describe the tool path, and an orientation of the laser with respect to the region.

In some examples, the computer 220 is further configured to position the machine tool 222 and orient the laser 230 according to respectively the positions that define the tool path and the orientation indicated by the instructions, and cause the machine tool to perform the laser ablation of the region of the structural part. In some examples, each orientation coordinate of the laser is selected to minimize a deviation between a normal of a centroid of the region, and a direction from the region to the laser as the machine tool orients the laser according to a corresponding orientation coordinate for the region being ablated. In some examples, the orientation of the laser that is indicated by the instructions is a single orientation that is maintained as the laser ablation of the region is performed.

In some examples, the computer 220 is further configured to send the instructions to the machine tool 222 to cause the machine tool to perform the laser ablation of the structural part.

FIG. 3A illustrates a digital model 300A of a component of a physical, tangible structural part. This digital model is representative of a portion of a digital model accessed by the method and computing systems of the present disclosure as described herein. As described herein, a physical structural part can be an aircraft component or any component of a vehicle or structure. The digital model of the component illustrated in FIG. 3A is a portion of a structural part illustrated in FIG. 5 and described in greater detail below. However, the principles and subject matter described herein can be applied to any structural part, portion(s) of a structural part (e.g., when ablating a portion of a structural part and not the entire part), component, or surface that requires laser ablation.

As illustrated in FIG. 3A, the digital model 300A of the component includes various features such as flat surfaces, walls, ramps 302A, and a trench 304A that forms near the crown. Each of these features make it difficult to perform an effective laser ablation if the laser (i.e., of the machine tool) is simply pointed orthogonal to a surface of one of the features of the physical component. For example, in FIG. 3A alone, if the laser were to be oriented such that it is orthogonal to the flat surface of the ramps of the corresponding physical component, the laser intensity would be sufficient to effectively ablate the top surface of the ramps, the top surface of the digital model of the physical component next to the ramps, and the top of the U-shaped arch (i.e., the crest or top of the hill-shaped part) in the physical component. However, the vertical portions as well as parts of the curves of the arch would not be effectively ablated, nor would portions of the ramps or the trench.

In order to achieve an effective ablation of each of the different surfaces on the physical component represented by the digital model 300A, the laser is reoriented one or more times. The most effective laser ablation with respect to increasing the adherence characteristics of the surfaces of the physical component, would include re-orienting the laser to be orthogonal to each surface of the physical component. However, this would be quite time consuming to have a different laser orientation for each of the surfaces on the component.

Some examples of the present disclosure minimize the above issue by analyzing the curves and surfaces of the digital model of the component to determine an orientation of the laser that will still effectively ablate the surfaces of the corresponding physical component, but does not require an orientation change of the laser for each individual surface. The subject matter of the present disclosure does this by first breaking the digital model of the component into multiple regions (i.e., tiles) and determines, for each region, an orientation of the laser such that, during ablation, an average laser intensity is maximized across each of the surfaces within the region. In this implementation, each surface is not necessarily its own region. In some implementations, there can be multiple surfaces (e.g., ramps, curves, walls, edges, etc.) in each region.

FIG. 3B illustrates a digital model 300B of the component that is similar to the digital model 300A in FIG. 3A, but that has been modified according to example implementations of the present disclosure. In some implementations of the present disclosure, before the digital model of the component (or structural part) can be split up into different regions, the digital model of the component is analyzed in order to determine which surfaces share a similar orientation. In some implementations, the digital model of the component is "smoothed" by applying a convolution matrix to the digital representation.

The digital model of the component in FIG. 3B illustrates the digital model of the component from FIG. 3A after which an example convolution matrix has been applied. As can be seen in FIG. 3B, the ramps 302B are "smoothed," meaning they don't have sharp edges or defined lines; the ramps are more of a curved bump. The trench 304B is more curved as well, as it has been smoothed from an almost right angle transition in FIG. 3A to a less immediately vertical transition in FIG. 3B. FIG. 3B still captures the major features of the digital model of the component, but it "smooths" over the smaller features as described above.

Following the application of the convolution matrix to the digital model 300B of the component from FIG. 3B, a Gauss map of the surface of the digital model of the component is computed. The Gauss map is a function that measures the normal of the surface at any point of the digital model of the component. From there, a contour graph of the digital model of the component can be generated using spline math and based on the Gauss map.

In this regard, the surface of the structural part can be represented as one or more tensor product Splines (although other parameterized surface representations could be used here). Here, the goal is to have the angle between the laser direction and the component to be no more than some angle, $\theta$. Given a laser direction, the curves on the surface of the component (e.g., contours) can be computed where the angle between the laser and the surface normal is exactly $\theta$. These contours will provide the boundaries for tiles when the laser is in a given direction. The equation for determining such a contour, $G \cdot d = \cos \theta$. Here, d is the direction of the laser and G is the gauss map of the surface of the component. The Gauss map itself is a surface (in the mathematical sense) and has 2 variables, u and v on the surface, and three responses (x, y, and z components of the normalized surface normal.) The equation above is thus an equation with two unknowns. There are different methods for solving this equation. One example method for solving the equation includes computing the Gauss map as a tensor product spline using the adaptive fitting algorithm defined in U.S. Pat. No. 8,417,485 to Grandine et al., the disclosure of which is incorporated herein by reference in its entirety. Next, with the computed Gauss map as a tensor product spline, the problem can be solved as a contouring problem. A similar approach is described in T. A. Grandine's 2000 paper, "Applications of Contouring", the disclosure of which is incorporated herein by reference in its entirety.

FIG. 4 illustrates the same digital model 300B of the component from FIG. 3B, except in FIG. 4, the digital model of the component has been divided into several different regions, or tiles, based on the contour graph generated. The digital model of the component has been divided into first tile 402A, second tile 402B, and third tile 402C. Each of these tiles represent a region of the digital model that corresponds to respective regions of a physical structural part (e.g., a physical section of an aircraft wing) identical to the digital model illustrated in FIG. 5. In some implementations, each of the regions or tiles can be substantially the same size as each other.

Each tile corresponds to a region of the physical component of the structural part at which the laser will have a discrete and potentially different orientation than the rest of the regions on the component. For example, first tile 402A and second tile 402B will likely require completely different laser orientations for ablating their respective surfaces because normals of their respective surfaces are separated close to 90 degrees from each other. On the other hand, first tile and third tile 402C would likely require more similar laser orientations because normals of their respective surfaces are separated by less than 90 degrees from each other.

Each component or section of the structural part is divided into one or more of these tiles by first observing the structural part and choosing a nominal set of directions that will ablate the structural part. For example, 45 degrees, −45 degrees, and 0 degrees. Next, the contours of those angles are computed as described hereinabove. Then, the computed contours are then used to define the regions of the structural parts that should be ablated by the nominal angles. Finally, each region of the structural part is divided to make tiles of a desired dimension (e.g., 12" wide by 12" long, etc.). The division is performed by orienting the region into roughly rectangular shape using a computation of the principal axis and then dividing it along the boundaries into 12" by 12" shapes. Some overlap in each tile is allowed to account for any geometric or process irregularities.

As described above, FIG. 5 illustrates a digital model or a surface representation 500 of a structural part with multiple components like the one illustrated in FIG. 3B. Each of the components or portions of the digital model of the structural part illustrated in FIG. 5, like the digital model 300B of the component, are consolidated to construct the surface representation of the structural part. As illustrated in FIG. 5, the surface representation or digital model of the structural part is tiled according to the steps described above, including first tile 402A, second tile 402B, and third tile 402C. In some implementations, each of the components are represented by respective single tensor products splines.

In order to perform effective laser ablation of the physical structural part, in some implementations, the laser 230 (which is a part of the machine tool 222) follows discrete tool paths that cover the entire structural part. Once the surface representation 500 of the structural part has been tiled, the systems and methods of the present disclosure determines the discrete tool paths that the machine tool, and therefore the laser, takes for respective ones of the tiles for laser ablation of the respective regions of the physical structural part. Determining the discrete tool paths includes determining an orientation of the laser at each of the regions of the structural part as the machine tool travels the discrete tool paths to perform the laser ablation. Once the discrete tool paths, including an orientation of the laser for each corresponding region of the structural part, are determined, instructions for the machine tool to perform the laser ablation of the physical structural part according to the discrete tool paths and laser orientations are generated and sent to the machine tool or laser for performing the instructions on the physical structural part.

In some implementations, discrete tool paths include a tool path of the machine tool 222 and laser 230 for laser ablation of a region, such as first tile 402A, of the structural part, and the instructions indicate positions of the machine tool that describe the tool path, and an orientation of the laser with respect to the region. In some implementations, the discrete tool paths can include any suitable tool path for the particular surface representation 500 of the structural part. For example, the discrete tool paths can include maneuvering the laser to different regions with similar surfaces or to regions that require similar laser orientations such that the orientation of the laser does not have to be altered substantially between regions. Some other implementations can include a tool path where the machine tool and laser are moved from left to right and top to bottom, similar to a typewriter movement.

In some implementations, the orientation of the laser at each tile or region is determined so as to minimize deviation between a normal of a centroid of the tile or region, and a direction from the tile or the region to the laser as the machine tool travels an immediately preceding one of the discrete tool paths.

In some implementations, the orientation of the laser at each tile or region can be defined by one or more orientation coordinates of the laser 230. As the orientation coordinates change, so too does the orientation of the laser. In some implementations, each orientation coordinate is selected to minimize deviation between a normal of a centroid of the region or tile, and a direction from the region to the laser as the machine tool orients the laser according to a corresponding orientation coordinate for the region being ablated. As an example, assume that d is the direction of the laser, specifically the direction towards the laser from the tile or region of the structural part and $F_n$, is the unit surface normal to the tile or region. To find the orientation coordinate of the laser for the corresponding tile or region of the structural part, the below integral needs to be maximized:

$$\max \int_F F_n \cdot d$$

The result of the above calculations can then be used to derive the orientation coordinate(s) of the laser for a given region or tile. The above calculations would need to be performed separately for each region or tile of the structural part.

In some implementations, the orientation of the laser does not change while laser ablation of a corresponding physical region or tile is performed. In other words, while the laser is ablating the region of the physical structural part corresponding to first tile 402A from the digital model, the orientation of the laser 230 will not change. Although the orientation of the laser could change as it moves from first tile to second tile 402B.

FIG. 6 illustrates a physical structural part 600 being ablated by a laser 230. The physical structural part is illustrated with the same tiles (i.e., shading) as those shown in FIG. 5, except here, they are merely shown for illustrative purposes to help visualize when the orientation of the laser will change between regions of the physical structural part 600.

As shown, the laser 230 is ablating first physical tile 602A. While ablating this region of the physical structural part 600, the orientation of the laser will not change as described above. However, when the laser follows the discrete tool paths to the second physical tile 602B, third physical tile 602C, and so forth, the orientation of the laser can change according to the calculations described herein.

FIGS. 7A-7G are flowcharts illustrating various steps in a method 700 of laser ablation of a structural part, according to various example implementations of the present disclosure. The method includes accessing a digital model of the structural part, as shown at block 702 of FIG. 7A. The method includes tiling the digital model into tiles that correspond to respective regions of the structural part, as shown at block 704. The method includes determining discrete tool paths of a machine tool for respective ones of the tiles for laser ablation of the respective regions of the structural part, as shown at block 706. And the method includes generating instructions for the machine tool to perform the laser ablation of the structural part according to the discrete tool paths, as shown at block 708. Additionally, at block 708, in some example implementations, a three-dimensional (3D) representation of the tiling is projected onto a two-dimensional (2D) coordinate system of the laser 230 so that the laser can be given instructions. This step is optional depending on how the laser is preprogrammed.

In some examples, the structural part includes a plurality of components, and the method further includes consolidating the plurality of components in the digital model to construct a surface representation of the structural part, as shown at block 710 of FIG. 7B. In some of these examples, tiling the digital model at block 704 includes tiling the surface representation, as shown at block 712.

In some examples, the plurality of components are consolidated at block 710 to construct the surface representation in which components of the plurality of components are represented by respective single tensor product splines.

In some examples, the method 700 further includes performing a smoothing of the surface representation before the surface representation is tiled, and in which a convolution matrix is applied to the surface representation, as shown at block 714 of FIG. 7C. The surface representation is smoothed with convolution as a preprocess step for computing the Gauss map. The resulting parameter space curves on the Gauss map are then applied to the original surface representation (without convolution).

In some examples, tiling the surface representation at block 712 includes computing a Gauss map of the surface representation, as shown at block 716 of FIG. 7D. In some of these examples, tiling the surface representation also includes generating a contour graph of the surface representation based on the Gauss map, as shown at block 718. And the surface representation is divided into the tiles based on the contour graph, as shown at block 720.

In some examples, the machine tool includes a laser, and determining the discrete tool paths at block 706 includes determining an orientation of the laser as the machine tool travels the discrete tool paths to perform the laser ablation, as shown at block 722 of FIG. 7E.

In some examples, the discrete tool paths include a tool path of the machine tool for laser ablation of a region of the respective regions of the structural part. In some of these examples, the orientation is determined at block 722 to minimize deviation between a normal of a centroid of the region, and a direction from the region to the laser as the machine tool travels an immediately preceding one of the discrete tool paths.

In some examples, the discrete tool paths include a tool path of the machine tool for laser ablation of a region of the respective regions of the structural part, and the instructions indicate positions of the machine tool that describe the tool path, and an orientation of the laser with respect to the region.

In some examples, the method 700 further includes positioning the machine tool and orienting the laser according to respectively the positions that define the tool path and the orientation indicated by the instructions, as shown at block 724 of FIG. 7F. In some of these examples, the method also includes causing the machine tool to perform the laser ablation of the region of the structural part, as shown at block 726.

In some examples, each orientation coordinate is selected to minimize deviation between a normal of a centroid of the region, and a direction from the region to the laser as the machine tool orients the laser according to a corresponding orientation coordinate for the region being ablated.

In some examples, the orientation of the laser that is indicated by the instructions is a single orientation that is maintained as the laser ablation of the region is performed at block 726.

In some examples, the method 700 further includes sending the instructions to the machine tool to cause the machine tool to perform the laser ablation of the structural part, as shown at block 728 of FIG. 7G.

According to example implementations of the present disclosure, the system for laser ablation of a structural part and its subsystems can be implemented by various means. Means for implementing the system and its subsystems can include hardware, alone or under direction of one or more computer programs from a computer-readable storage medium. In some examples, one or more apparatuses can be configured to function as or otherwise implement the system and its subsystems shown and described herein. In examples involving more than one apparatus, the respective apparatuses can be connected to or otherwise in communication with one another in a number of different manners, such as directly or indirectly via a wired or wireless network or the like.

FIG. 8 illustrates an apparatus 800 according to some example implementations of the present disclosure. Generally, an apparatus of exemplary implementations of the present disclosure can comprise, include or be embodied in one or more fixed or portable electronic devices. Examples of suitable electronic devices include a smartphone, tablet computer, laptop computer, desktop computer, workstation computer, server computer or the like. The apparatus can include one or more of each of a number of components such as, for example, processing circuitry 802 (e.g., processor unit) connected to a memory 804 (e.g., storage device).

The processing circuitry 802 can be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which can be packaged as an integrated circuit or multiple interconnected integrated circuits (an integrated circuit at times more commonly referred to as a "chip"). The processing circuitry can be configured to execute computer programs, which can be stored onboard the processing circuitry or otherwise stored in the memory 804 (of the same or another apparatus).

The processing circuitry 802 can be a number of processors, a multi-core processor or some other type of processor, depending on the particular implementation. Further, the processing circuitry can be implemented using a number of heterogeneous processor systems in which a main processor is present with one or more secondary processors on a single chip. As another illustrative example, the processing circuitry can be a symmetric multi-processor system containing multiple processors of the same type. In yet another example, the processing circuitry can be embodied as or otherwise include one or more ASICs, FPGAs or the like. Thus, although the processing circuitry can be capable of executing a computer program to perform one or more functions, the processing circuitry of various examples can be capable of performing one or more functions without the aid of a computer program. In either instance, the processing circuitry can be appropriately programmed to perform functions or operations according to example implementations of the present disclosure.

The memory 804 is generally any piece of computer hardware that is capable of storing information such as, for example, data, computer programs (e.g., computer-readable program code 806) and/or other suitable information either on a temporary basis and/or a permanent basis. The memory can include volatile and/or non-volatile memory, and can be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks can include compact disk-read only memory (CD-ROM), compact disk-read/write (CD-R/W), DVD or the like. In various instances, the memory can be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein can generally refer to a computer-readable storage medium or computer-readable transmission medium.

In addition to the memory 804, the processing circuitry 802 can also be connected to one or more interfaces for displaying, transmitting and/or receiving information. The interfaces can include a communications interface 808 (e.g., communications unit) and/or one or more user interfaces. The communications interface can be configured to transmit and/or receive information, such as to and/or from other apparatus(es), network(s) or the like. The communications interface can be configured to transmit and/or receive information by physical (wired) and/or wireless communications links. Examples of suitable communication interfaces include a network interface controller (NIC), wireless NIC (WNIC) or the like.

The user interfaces can include a display 810 and/or one or more user input interfaces 812 (e.g., input/output unit). The display can be configured to present or otherwise display information to a user, suitable examples of which include a liquid crystal display (LCD), light-emitting diode display (LED), plasma display panel (PDP) or the like. The user input interfaces can be wired or wireless, and can be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces can further include one or more interfaces for communicating with peripherals such as printers, scanners or the like.

As indicated above, program code instructions can be stored in memory, and executed by processing circuitry that is thereby programmed, to implement functions of the systems, subsystems, tools and their respective elements described herein. As will be appreciated, any suitable program code instructions can be loaded onto a computer or other programmable apparatus from a computer-readable storage medium to produce a particular machine, such that the particular machine becomes a means for implementing the functions specified herein. These program code instructions can also be stored in a computer-readable storage medium that can direct a computer, a processing circuitry or other programmable apparatus to function in a particular manner to thereby generate a particular machine or particular article of manufacture. The instructions stored in the computer-readable storage medium can produce an article of manufacture, where the article of manufacture becomes a means for implementing functions described herein. The program code instructions can be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions can be performed sequentially such that one instruction is retrieved, loaded and executed at a time. In some example implementations, retrieval, loading and/or execution can be performed in parallel such that multiple instructions are retrieved, loaded, and/or executed together. Execution of the program code instructions can produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 800 can include a processing circuitry 802 and a computer-readable storage medium or memory 804 coupled to the processing circuitry, where the processing circuitry is configured to execute computer-readable program code 806 stored in the memory. It will also be understood that one or more functions, and combinations of functions, can be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for laser ablation of a structural part, the apparatus comprising: a memory configured to store computer-readable program code; and processing circuitry configured to access the memory, and execute the computer-readable program code to cause the apparatus to at least: access a digital model of the structural part; tile the digital model into tiles that correspond to respective regions of the structural part; determine discrete tool paths of a machine tool for respective ones of the tiles for laser ablation of the respective regions of the structural part; and generate instructions for the machine tool to perform the laser ablation of the structural part according to the discrete tool paths.

Clause 2. The apparatus of clause 1, wherein the structural part includes a plurality of components, the processing circuitry is configured to execute the computer-readable program code to cause the apparatus to further consolidate the plurality of components in the digital model to construct a surface representation of the structural part, and the apparatus caused to tile the digital model includes the apparatus caused to tile the surface representation.

Clause 3. The apparatus of clause 2, wherein the plurality of components are consolidated to construct the surface representation in which components of the plurality of components are represented by respective single tensor product splines.

Clause 4. The apparatus of clause 2 or clause 3, wherein the processing circuitry is configured to execute the computer-readable program code to cause the apparatus to further perform a smoothing of the surface representation before the surface representation is tiled, and in which a convolution matrix is applied to the surface representation.

Clause 5. The apparatus of any of clauses 2 to 4, wherein the apparatus caused to tile the surface representation includes the apparatus caused to: compute a Gauss map of the surface representation; generate a contour graph of the surface representation based on the Gauss map; and divide the surface representation into the tiles based on the contour graph.

Clause 6. The apparatus of any of clauses 1 to 5, wherein the machine tool includes a laser, and the apparatus caused to determine the discrete tool paths includes the apparatus caused to determine an orientation of the laser as the machine tool travels the discrete tool paths to perform the laser ablation.

Clause 7. The apparatus of clause 6, wherein the discrete tool paths include a tool path of the machine tool for laser ablation of a region of the respective regions of the structural part, and the orientation is determined to minimize deviation between a normal of a centroid of the region, and a direction from the region to the laser as the machine tool travels an immediately preceding one of the discrete tool paths.

Clause 8. The apparatus of clause 6 or clause 7, wherein the discrete tool paths include a tool path of the machine tool for laser ablation of a region of the respective regions of the structural part, and the instructions indicate positions of the machine tool that describe the tool path, and an orientation of the laser with respect to the region.

Clause 9. The apparatus of any of clauses 6 to 8, wherein the processing circuitry is configured to execute the computer-readable program code to cause the apparatus to further position the machine tool and orienting the laser according to respectively the positions that define the tool path and the orientation indicated by the instructions, and cause the machine tool to perform the laser ablation of the region of the structural part.

Clause 10. The apparatus of clause 9, wherein each orientation coordinate is selected to minimize deviation between a normal of a centroid of the region, and a direction from the region to the laser as the machine tool orients the laser according to a corresponding orientation coordinate for the region being ablated.

Clause 11. The apparatus of any of clauses 6 to 10, wherein the orientation of the laser that is indicated by the instructions is a single orientation that is maintained as the laser ablation of the region is performed.

Clause 12. The apparatus of any of clauses 1 to 11, wherein the processing circuitry is configured to execute the computer-readable program code to cause the apparatus to further send the instructions to the machine tool to cause the machine tool to perform the laser ablation of the structural part.

Clause 13. A method of laser ablation of a structural part, the method comprising: accessing a digital model of the structural part; tiling the digital model into tiles that correspond to respective regions of the structural part; determining discrete tool paths of a machine tool for respective ones of the tiles for laser ablation of the respective regions of the structural part; and generating instructions for the machine tool to perform the laser ablation of the structural part according to the discrete tool paths.

Clause 14. The method of clause 13, wherein the structural part includes a plurality of components, the method further comprises consolidating the plurality of components in the digital model to construct a surface representation of the structural part, and tiling the digital model includes tiling the surface representation.

Clause 15. The method of clause 14, wherein the plurality of components are consolidated to construct the surface representation in which components of the plurality of components are represented by respective single tensor product splines.

Clause 16. The method of clause 14 or clause 15, wherein the method further comprises performing a smoothing of the surface representation before the surface representation is tiled, and in which a convolution matrix is applied to the surface representation.

Clause 17. The method of any of clauses 14 to 16, wherein tiling the surface representation includes: computing a Gauss map of the surface representation; generating a contour graph of the surface representation based on the Gauss map; and dividing the surface representation into the tiles based on the contour graph.

Clause 18. The method of any of clauses 13 to 17, wherein the machine tool includes a laser, and determining the discrete tool paths includes determining an orientation of the laser as the machine tool travels the discrete tool paths to perform the laser ablation.

Clause 19. The method of clause 18, wherein the discrete tool paths include a tool path of the machine tool for laser ablation of a region of the respective regions of the structural part, and the orientation is determined to minimize deviation between a normal of a centroid of the region, and a direction from the region to the laser as the machine tool travels an immediately preceding one of the discrete tool paths.

Clause 20. The method of clause 18 or clause 19, wherein the discrete tool paths include a tool path of the machine tool for laser ablation of a region of the respective regions of the structural part, and the instructions indicate positions of the machine tool that describe the tool path, and an orientation of the laser with respect to the region.

Clause 21. The method of any of clauses 18 to 20, wherein the method further comprises positioning the machine tool and orienting the laser according to respectively the positions that define the tool path and the orientation indicated by the instructions, and causing the machine tool to perform the laser ablation of the region of the structural part.

Clause 22. The method of clause 21, wherein each orientation coordinate is selected to minimize deviation between a normal of a centroid of the region, and a direction from the region to the laser as the machine tool orients the laser according to a corresponding orientation coordinate for the region being ablated.

Clause 23. The method of any of clauses 18 to 22, wherein the orientation of the laser that is indicated by the instructions is a single orientation that is maintained as the laser ablation of the region is performed.

Clause 24. The method of any of clauses 13 to 23, wherein the method further comprises sending the instructions to the machine tool to cause the machine tool to perform the laser ablation of the structural part.

Clause 25. A computer-readable storage medium for laser ablation of a structural part, the computer-readable storage medium being non-transitory and having computer-readable program code stored therein that, in response to execution by processing circuitry, causes an apparatus to at least: access a digital model of the structural part; tile the digital model into tiles that correspond to respective regions of the structural part; determine discrete tool paths of a machine tool for respective ones of the tiles for laser ablation of the respective regions of the structural part; and generate instructions for the machine tool to perform the laser ablation of the structural part according to the discrete tool paths.

Clause 26. The computer-readable storage medium of clause 25, wherein the structural part includes a plurality of components, the computer-readable storage medium has further computer-readable program code stored therein that, in response to execution by the processing circuitry, causes the apparatus to further consolidate the plurality of components in the digital model to construct a surface representation of the structural part, and the apparatus caused to tile the digital model includes the apparatus caused to tile the surface representation.

Clause 27. The computer-readable storage medium of clause 26, wherein the plurality of components are consolidated to construct the surface representation in which components of the plurality of components are represented by respective single tensor product splines.

Clause 28. The computer-readable storage medium of clause 26 or clause 27, wherein the computer-readable storage medium has further computer-readable program code stored therein that, in response to execution by the processing circuitry, causes the apparatus to further perform a smoothing of the surface representation before the surface representation is tiled, and in which a convolution matrix is applied to the surface representation.

Clause 29. The computer-readable storage medium of any of clauses 26 to 28, wherein the apparatus caused to tile the surface representation includes the apparatus caused to: compute a Gauss map of the surface representation; generate a contour graph of the surface representation based on the Gauss map; and divide the surface representation into the tiles based on the contour graph.

Clause 30. The computer-readable storage medium of any of clauses 25 to 29, wherein the machine tool includes a laser, and the apparatus caused to determine the discrete tool paths includes the apparatus caused to determine an orientation of the laser as the machine tool travels the discrete tool paths to perform the laser ablation.

Clause 31. The computer-readable storage medium of clause 30, wherein the discrete tool paths include a tool path of the machine tool for laser ablation of a region of the respective regions of the structural part, and the orientation is determined to minimize deviation between a normal of a centroid of the region, and a direction from the region to the laser as the machine tool travels an immediately preceding one of the discrete tool paths.

Clause 32. The computer-readable storage medium of clause 30 or clause 31, wherein the discrete tool paths include a tool path of the machine tool for laser ablation of a region of the respective regions of the structural part, and the instructions indicate positions of the machine tool that describe the tool path, and an orientation of the laser with respect to the region.

Clause 33. The computer-readable storage medium of any of clauses 30 to 32, wherein the computer-readable storage medium has further computer-readable program code stored therein that, in response to execution by the processing circuitry, causes the apparatus to further position the machine tool and orienting the laser according to respectively the positions that define the tool path and the orientation indicated by the instructions, and cause the machine tool to perform the laser ablation of the region of the structural part.

Clause 34. The computer-readable storage medium of clause 33, wherein each orientation coordinate is selected to minimize deviation between a normal of a centroid of the region, and a direction from the region to the laser as the machine tool orients the laser according to a corresponding orientation coordinate for the region being ablated.

Clause 35. The computer-readable storage medium of any of clauses 30 to 34, wherein the orientation of the laser that is indicated by the instructions is a single orientation that is maintained as the laser ablation of the region is performed.

Clause 36. The computer-readable storage medium of any of clauses 25 to 35, wherein the computer-readable storage medium has further computer-readable program code stored therein that, in response to execution by the processing circuitry, causes the apparatus to further send the instructions to the machine tool to cause the machine tool to perform the laser ablation of the structural part.

Clause 37. A system for laser ablation, the system comprising: a machine tool configured to perform laser ablation of a structural part; and a computer configured to receive instructions, and control the machine tool to perform the laser ablation according to the instructions that include discrete tool paths of the machine tool for laser ablation of respective regions of the structural part, the discrete tool paths having been determined from a tiling of a digital model of the structural part into tiles that correspond to respective ones of the regions.

Clause 38. The system of clause 37, wherein the machine tool comprises a laser, and the instructions include an orientation of the laser as the machine tool travels the discrete tool paths to perform the laser ablation.

Clause 39. The system of clause 38, wherein the laser comprises a UV laser, carbon dioxide laser, or a neodymium-doped yttrium aluminum garnet (Nd:YAG) laser.

Clause 40. The system of clause 38 or clause 39, wherein the discrete tool paths include a tool path of the machine tool for laser ablation of a region of respective regions of the structural part, and the orientation has been determined to minimize deviation between a normal of a centroid of the region, and a direction from the region to the laser as the machine tool travels an immediately preceding one of the discrete tool paths, and wherein the discrete tool paths include a tool path of the machine tool for laser ablation of a region of the respective regions of the structural part, and the instructions indicate positions of the machine tool that describe the tool path, and an orientation of the laser with respect to the region.

Clause 41. The system of any of clauses 38 to 40, wherein the computer is configured to further position the machine tool and orient the laser according to respectively positions that define the tool path and the orientation indicated by the instructions, and control the machine tool to perform the laser ablation of a region of the respective regions the structural part, and wherein each orientation has been selected to minimize deviation between a normal of a centroid of the region, and a direction from the region to the laser as the machine tool orients the laser according to a corresponding orientation for the region being ablated.

Clause 42. The system of any of clauses 38 to 41, wherein the orientation of the laser that is indicated by the instructions is a single orientation that is maintained as the laser ablation of a region of the structural part is performed.

Clause 43. The system of any of clauses 37 to 42, wherein the system further comprises a power supply configured to provide power to the machine tool and the computer.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated FIGURES describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for laser ablation of a structural part, the apparatus comprising:
   a memory configured to store computer-readable program code; and
   processing circuitry configured to access the memory, and execute the computer-readable program code to cause the apparatus to at least:
   access a digital model of the structural part;
   tile the digital model into tiles that correspond to respective regions of the structural part, wherein the structural part includes a plurality of components;
   consolidate the plurality of components in the digital model to construct a surface representation of the structural part, wherein the surface representation is tiled in the digital model, and wherein the surface representation of one or more of the respective regions are different from each other;
   determine discrete tool paths of a machine tool for respective ones of the tiles for the laser ablation of the respective regions of the structural part, wherein the machine tool includes a laser; and
   determine an orientation of the laser based on the surface representation of the respective regions as the machine tool travels the discrete tool paths to perform the laser ablation, wherein each orientation of the laser is selected to minimize deviation between a normal of a centroid of each of the respective regions, and a direction from the respective regions to the laser as the machine tool orients the laser according to a corresponding orientation for the respective one of the regions being ablated;
   generate instructions for the machine tool to perform the laser ablation of the structural part according to the discrete tool paths.

2. The apparatus of claim 1,
   wherein the plurality of components are consolidated to construct the surface representation in which components of the plurality of components are represented by respective single tensor product splines.

3. The apparatus of claim 2, wherein the processing circuitry is configured to execute the computer-readable program code to cause the apparatus to perform a smoothing of the surface representation before the surface representation is tiled, and in which a convolution matrix is applied to the surface representation.

4. The apparatus of claim 2, wherein the tiling of the surface representation includes the apparatus caused to:
   compute a Gauss map of the surface representation;
   generate a contour graph of the surface representation based on the Gauss map; and
   divide the surface representation into the tiles based on the contour graph.

5. The apparatus of claim 1, wherein the discrete tool paths include a tool path of the machine tool for the laser ablation of a region of the respective regions of the structural part, and the orientation of the laser is determined to minimize deviation between the normal of the centroid of the respective regions, and the direction from the respective regions to the laser as the machine tool travels an immediately preceding one of the discrete tool paths, and
   wherein the instructions indicate positions of the machine tool that describe the tool path, and the orientation of the laser with respect to the region of the respective regions.

6. The apparatus of claim 1, wherein the processing circuitry is configured to execute the computer-readable program code to cause the apparatus to position the machine tool and orient the laser according to respectively the positions that define the tool path and the orientation indicated by the instructions, and cause the machine tool to perform the laser ablation of a region of the respective regions the structural part.

7. The apparatus of claim 1, wherein the orientation of the laser that is indicated by the instructions is a single orientation that is maintained across the regions of similar surface representations as the laser ablation of the respective regions is performed.

8. The apparatus of claim 1, wherein the processing circuitry is configured to execute the computer-readable program code to cause the apparatus to send the instructions to the machine tool to cause the machine tool to perform the laser ablation of the structural part.

9. A method of laser ablation of a structural part having a surface representation, the method comprising:
   accessing a digital model of the structural part;
   tiling the digital model into tiles that correspond to respective regions of the structural part;
   constructing the surface representation of the structural part, wherein the surface representation of one or more of the respective regions are different from each other;
   wherein tiling the digital model includes tiling the surface representation,
   determining discrete tool paths of a machine tool for respective ones of the tiles for the laser ablation of the respective regions of the structural part, wherein the machine tool includes a laser; and
   determining the discrete tool paths includes determining an orientation of the laser based on the surface representation of the respective regions as the machine tool travels the discrete tool paths to perform the laser ablation, wherein each orientation of the laser is selected to minimize deviation between a normal of a centroid of each of the respective regions, and a direction from the respective regions to the laser as the machine tool orients the laser according to a corresponding orientation for the respective one of the regions being ablated;
   generating instructions for the machine tool to perform the laser ablation of the structural part according to the discrete tool paths.

10. The method of claim 9, wherein the structural part includes a plurality of components, the method further comprises consolidating the plurality of components in the digital model to construct the surface representation of the structural part, and tiling the digital model includes tiling the surface representation of the components.

11. The method of claim 10, wherein the plurality of components are consolidated to construct the surface representation in which components of the plurality of components are represented by respective single tensor product splines, and wherein the method further comprises performing a smoothing of the surface representation before the surface representation is tiled, and in which a convolution matrix is applied to the surface representation.

12. The method of claim 10, wherein tiling the surface representation includes:
computing a Gauss map of the surface representation;
generating a contour graph of the surface representation based on the Gauss map; and
dividing the surface representation into the tiles based on the contour graph.

13. The method of claim 9, wherein the discrete tool paths include a tool path of the machine tool for the laser ablation of a region of the respective regions of the structural part, and the orientation of the laser is determined to minimize deviation between the normal of the centroid of the respective regions, and the direction from the respective regions to the laser as the machine tool travels an immediately preceding one of the discrete tool paths.

14. The method of claim 9, wherein the discrete tool paths include a tool path of the machine tool for the laser ablation of a region of the respective regions of the structural part, and the instructions indicate positions of the machine tool that describe the tool path, and the orientation of the laser with respect to the respective regions.

15. The method of claim 9, wherein the method further comprises positioning the machine tool and orienting the laser according to respectively the positions that define the tool path and the orientation indicated by the instructions, and causing the machine tool to perform the laser ablation of a region of the respective regions of the structural part.

16. The method of claim 9, wherein the orientation of the laser that is indicated by the instructions is a single orientation that is maintained across the regions of similar surface representations as the laser ablation of a region of the respective regions is performed.

17. The method of claim 9, further comprising maneuvering the laser to different ones of the regions having surface representations that require a similar orientation of the laser such that the orientation of the laser remains substantially the same between the different ones of the regions.

18. A computer-readable storage medium for laser ablation of a structural part, the computer-readable storage medium being non-transitory and having computer-readable program code stored therein that, in response to execution by processing circuitry, causes an apparatus to at least:
access a digital model of the structural part;
tile the digital model into tiles that correspond to respective regions of the structural part, wherein the structural part includes a plurality of components;
consolidate the plurality of components in the digital model to construct a surface representation of the structural part, wherein the surface representation is tiled in the digital model, and wherein the surface representation of one or more of the respective regions are different from each other;
determine discrete tool paths of a machine tool for respective ones of the tiles for the laser ablation of the respective regions of the structural part, wherein the machine tool includes a laser; and
determine an orientation of the laser based on the surface representation of the respective regions as the machine tool travels the discrete tool paths to perform the laser ablation, wherein each orientation of the laser is selected to minimize deviation between a normal of a centroid of each of the respective regions, and a direction from the respective regions to the laser as the machine tool orients the laser according to a corresponding orientation for the respective one of the regions being ablated;
generate instructions for the machine tool to perform the laser ablation of the structural part according to the discrete tool paths.

19. The computer-readable storage medium of claim 18, wherein execution of the computer-readable program code by the processing circuitry further causes the apparatus to at least facilitate a transmission of the instructions to the machine tool to thereby cause the machine tool to perform the laser ablation of the structural part.

20. A system for laser ablation, the system comprising:
a machine tool including a laser configured to perform the laser ablation of a structural part; and
a computer configured to receive instructions, and control the machine tool to perform the laser ablation according to the instructions that include discrete tool paths of the machine tool for the laser ablation of respective regions of the structural part, the discrete tool paths having been determined from a tiling of a digital model of the structural part into tiles that correspond to respective ones of the regions, wherein the digital model includes a construction of a surface representation of the structural part, wherein the surface representation is tiled in the digital model, and wherein the surface representation of one or more of the respective regions are different from each other;
wherein an orientation of the laser is based on the surface representation of the respective regions as the machine tool travels the discrete tool paths to perform the laser ablation; and
wherein each orientation of the laser is selected to minimize deviation between a normal of a centroid of each of the respective regions, and a direction from the respective regions to the laser as the machine tool orients the laser according to a corresponding orientation for the respective one of the regions being ablated.

21. The system of claim 20, wherein the orientation of the laser is a first orientation when a first region of the regions is being ablated, and the orientation of the laser is a second orientation when a second region of the regions is being ablated, wherein the first orientation and the second orientation is different, and wherein the first region and the second region are spaced apart from each other.

* * * * *